United States Patent
Bilski et al.

(10) Patent No.: US 11,016,822 B1
(45) Date of Patent: May 25, 2021

(54) CASCADE STREAMING BETWEEN DATA PROCESSING ENGINES IN AN ARRAY

(71) Applicant: Xilinx, Inc., San Jose, CA (US)

(72) Inventors: Goran H. K. Bilski, Molndal (SE); Juan J. Noguera Serra, San Jose, CA (US); Jan Langer, Chemnitz (DE); Baris Ozgul, Dundrum (IE); Richard L. Walke, Edinburgh (GB)

(73) Assignee: XILINX, INC., San Jose, CA (US)

( * ) Notice: Subject to any disclaimer, the term of this patent is extended or adjusted under 35 U.S.C. 154(b) by 224 days.

(21) Appl. No.: 15/944,578

(22) Filed: Apr. 3, 2018

(51) Int. Cl.
*G06F 9/50* (2006.01)
*G06F 9/48* (2006.01)

(52) U.S. Cl.
CPC .......... *G06F 9/5088* (2013.01); *G06F 9/4881* (2013.01)

(58) Field of Classification Search
CPC ............................. G06F 9/5088; G06F 9/4881
See application file for complete search history.

(56) References Cited

U.S. PATENT DOCUMENTS

| | | | |
|---|---|---|---|
| 3,776,137 A | 12/1973 | Abbott | |
| 6,005,410 A * | 12/1999 | Laramie | H01L 23/525 257/E23.146 |
| 6,041,400 A * | 3/2000 | Ozcelik | G06F 15/8015 712/20 |
| 6,091,263 A | 7/2000 | New et al. | |
| 6,150,839 A | 11/2000 | New et al. | |
| 6,204,687 B1 | 3/2001 | Schultz et al. | |
| 6,462,579 B1 | 10/2002 | Camilleri et al. | |
| 6,526,557 B1 | 2/2003 | Young et al. | |
| 6,759,869 B1 | 7/2004 | Young et al. | |
| 6,810,514 B1 | 10/2004 | Alfke et al. | |
| 6,836,842 B1 | 12/2004 | Guccione et al. | |
| 6,907,595 B2 | 6/2005 | Curd et al. | |
| 7,024,651 B1 | 4/2006 | Camilleri et al. | |
| 7,057,413 B1 | 6/2006 | Young et al. | |
| 7,124,338 B1 | 10/2006 | Mark et al. | |
| 7,224,184 B1 | 5/2007 | Levi et al. | |
| 7,302,625 B1 | 11/2007 | Payakapan et al. | |
| 7,477,072 B1 | 1/2009 | Kao et al. | |

(Continued)

OTHER PUBLICATIONS

"BlueField Multicore System on Chip," Mellanox Technologies, Ltd. © 2017, Product Brief 52964, Rev. 2.4, 4 pg.

(Continued)

*Primary Examiner* — Shanto Abedin
*Assistant Examiner* — Bruce S Ashley
(74) *Attorney, Agent, or Firm* — Patterson + Sheridan, LLP

(57) ABSTRACT

Examples herein describe techniques for communicating directly between cores in an array of data processing engines. In one embodiment, the array is a 2D array where each of the data processing engines includes one or more cores. In addition to the cores, the data processing engines can include a memory module (with memory banks for storing data) and an interconnect which provides connectivity between the cores. Using the interconnect, however, can add latency when transmitting data between the cores. In the embodiments herein, the array includes core-to-core communication links that directly connect one core in the array to another core. The cores can use these communication links to bypass the interconnect and the memory module to transmit data directly.

21 Claims, 7 Drawing Sheets

(56) References Cited

U.S. PATENT DOCUMENTS

| | | | |
|---|---|---|---|
| 7,478,357 B1 | 1/2009 | Mason et al. | |
| 7,482,836 B2 | 1/2009 | Levi et al. | |
| 7,509,617 B1 | 3/2009 | Young | |
| 7,518,396 B1 | 4/2009 | Kondapalli et al. | |
| 7,546,572 B1 | 6/2009 | Ballagh et al. | |
| 7,619,442 B1 | 11/2009 | Mason et al. | |
| 7,640,527 B1 | 12/2009 | Dorairaj et al. | |
| 7,650,448 B2 * | 1/2010 | Vorbach | G11C 7/10 |
| | | | 710/100 |
| 7,724,815 B1 | 5/2010 | Raha et al. | |
| 7,746,099 B1 | 6/2010 | Chan et al. | |
| 8,090,013 B2 * | 1/2012 | Farhoodfar | H04L 25/4975 |
| | | | 348/607 |
| 8,102,188 B1 | 1/2012 | Chan et al. | |
| 8,250,342 B1 | 8/2012 | Kostamov et al. | |
| 8,359,448 B1 | 1/2013 | Neuendorffer | |
| 8,415,974 B1 | 4/2013 | Lysaght | |
| 8,429,394 B1 * | 4/2013 | Natoli | G06F 9/44547 |
| | | | 713/100 |
| 8,719,750 B1 | 5/2014 | Balzli, Jr. | |
| 8,796,539 B2 | 8/2014 | Asaumi et al. | |
| 8,928,351 B1 | 1/2015 | Konduru | |
| 9,081,634 B1 | 7/2015 | Simkins et al. | |
| 9,722,613 B1 | 8/2017 | Schultz et al. | |
| 2003/0007636 A1 * | 1/2003 | Alves | G06F 1/3203 |
| | | | 380/37 |
| 2004/0137805 A1 * | 7/2004 | Mylly | G06F 13/4081 |
| | | | 439/894 |
| 2007/0180310 A1 * | 8/2007 | Johnson | G06F 15/16 |
| | | | 714/12 |
| 2012/0200315 A1 * | 8/2012 | Dimond | G06F 30/34 |
| | | | 326/39 |
| 2017/0364475 A1 * | 12/2017 | Liu | G06F 15/17343 |

OTHER PUBLICATIONS

"NP-5 Network Processor," Mellanox Technologies, Ltd. © 2017, Product Brief 53042, Rev. 2.1, 2 pg.

"Tile-Gx672 Processor," Mellanox Technologies, Ltd. © 2015-2016, Product Brief 041, Rev. 4.0, 2 pg.

"Kalray NVMe-oF Target Controller Solutions," Kalray Corporation White Paper, Dec. 18, 2017, 14 pg.

"EZ Chip Tile-Gx72 Processor Product Brief," EZchip Semiconductor, Inc. © 2015, Product Brief 041, Re. 4.0, Feb. 14, 2015, 2 pg.

Schooler, R., "Tile processors: Many-core for embedded and cloud computing," in Workshop on High Performance Embedded Computing, Sep. 15, 2010, 35 pg.

Doud, B., "Accelerating the data plane with the tile-mx manycore processor," in Linley Data Center Conference, Feb. 25-26, 2015, 19 pg.

Wentzlaff, D., et al., "On-chip interconnection architecture of the tile processor," IEEE Micro, vol. 27, No. 5, Sep. 2007, pp. 15-31.

"MPPA Processors for Autonomous Driving," Kalray Corporation White Paper, May 25, 2017, 18 pg.

"Deep Learning for High-Performance Embedded Applications," Kalray Corporation White Paper, Mar. 16, 2017, 19 pg.

"UltraScale Architecture DSP Slice," Xilinx, Inc. User Guide, UG579 (v1.5) Oct. 18, 2017, 74 pg.

* cited by examiner

CASCADE STREAMING BETWEEN DATA PROCESSING ENGINES IN AN ARRAY

TECHNICAL FIELD

Examples of the present disclosure generally relate to direct core-to-core communication.

BACKGROUND

A processor, a system on a chip (SoC), and an application specific integrated circuit (ASIC) can include multiple cores for performing compute operations such as processing digital signals, performing cryptography, executing software applications, rendering graphics, and the like. In some examples, the cores may transmit data between each other when performing the compute operations. Typically, transferring data between cores requires the data to pass through a core-to-core interface that adds latency and is an inefficient use of memory.

SUMMARY

Techniques for transferring data between cores are described. One example is a method that includes processing data in a first core and transmitting data directly from the first core to a second core using a core-to-core communication link where the first and second cores are disposed in respective first and second data processing engines in a SoC and where the first and second data processing engines are disposed in an array of data processing engines. The method also includes receiving the data at the second core.

One example described herein is a SoC that includes a first data processing engine in an array of data processing engines and a second data processing engine in the array where the first and second data processing engines comprise a first core and a second core, respectively. The SoC also includes a core-to-core communication link coupled to the first core at a first end and the second core at a second end and the first core is configured to transmit data directly to the second core using the core-to-core communication link.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
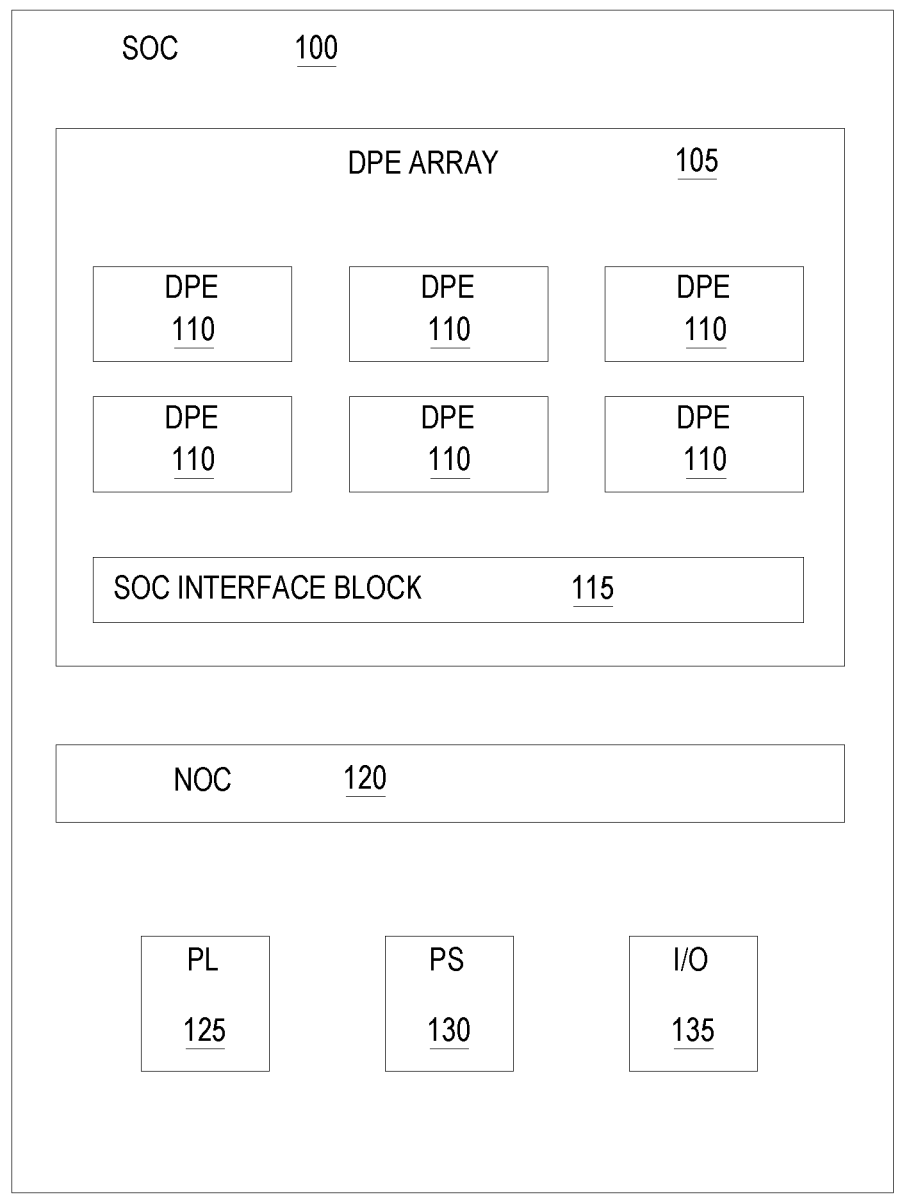
FIG. 1 is a block diagram of a SoC that includes a data processing engine array, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Examples herein describe techniques for communicating directly between cores in an array of data processing engines (DPEs). In one embodiment, the array is a two dimensional (2D) array where each of the DPEs includes one or more cores. In addition to the cores, the DPEs can include a memory module (with memory banks for storing data) and an interconnect which provides connectivity between the cores. Using the interconnect, however, can add latency when transmitting data between the cores. In the embodiments herein, the array includes core-to-core communication links that directly connect one core in the array to another core. The cores can use these communication links to bypass the interconnect and the memory module to transmit data directly. In one embodiment, the core-to-core communication link is a streaming link that permits one core to transmit streaming data to another core.

In one embodiment, a core has core-to-core communication links to multiple neighboring cores. For example, each core may have core-to-core communication links to directly adjacent cores in the array. For example, the cores may have core-to-core communication links to the cores disposed to the right, left, up, and down of the core. In one embodiment, the cores can use these links to transmit data directly to the neighboring cores without using external memory elements. For example, the cores can transmit data directly without using buffers in the interconnect or the memory modules which may result in reduced latency for core-to-core communications.

FIG. 1 is a block diagram of a SoC 100 that includes a DPE array 105, according to an example. The DPE array 105 includes a plurality of DPEs 110 which may be arranged in a grid, cluster, or checkerboard pattern in the SoC 100. Although FIG. 1 illustrates arranging the DPEs 110 in a 2D array with rows and columns, the embodiments are not limited to this arrangement. Further, the array 105 can be any size and have any number of rows and columns formed by the DPEs 110.

In one embodiment, the DPEs 110 are identical. That is, each of the DPEs 110 (also referred to as tiles or blocks) may have the same hardware components or circuitry. Further, the embodiments herein are not limited to DPEs 110. Instead, the SoC 100 can include an array of any kind of processing elements, for example, the DPEs 110 could be digital signal processing engines, cryptographic engines, Forward Error Correction (FEC) engines, or other specialized hardware for performing one or more specialized tasks.

In FIG. 1, the array 105 includes DPEs 110 that are all the same type (e.g., a homogeneous array). However, in another embodiment, the array 105 may include different types of engines. For example, the array 105 may include digital signal processing engines, cryptographic engines, graphic processing engines, and the like. Regardless if the array 105 is homogenous or heterogeneous, the DPEs 110 can include direct connections between DPEs 110 which permit the DPEs 110 to transfer data directly as described in more detail below.

In one embodiment, the DPEs 110 are formed from non-programmable logic—i.e., are hardened using, for example, standard cells and/or full-custom silicon implementation methodologies. One advantage of doing so is that the DPEs 110 may take up less space in the SoC 100 relative to using programmable logic to form the hardware elements in the DPEs 110. That is, using hardened or non-programmable logic circuitry to form the hardware elements in the DPE 110 such as program memories, an instruction fetch/decode unit, fixed-point vector units, floating-point vector units, arithmetic logic units (ALUs), multiply accumulators (MAC), and the like can significantly reduce the footprint of the array 105 in the SoC 100. Although the DPEs 110 may be hardened, this does not mean the DPEs 110 are not programmable. That is, the DPEs 110 can be configured when the SoC 100 is powered on or rebooted to perform different functions or tasks.

The DPE array 105 also includes a SoC interface block 115 (also referred to as a shim) that serves as a communication interface between the DPEs 110 and other hardware components in the SoC 100. In this example, the SoC 100 includes a network on chip (NoC) 120 that is communicatively coupled to the SoC interface block 115. Although not shown, the NoC 120 may extend throughout the SoC 100 to permit the various components in the SoC 100 to communicate with each other. For example, in one physical implementation, the DPE array 105 may be disposed in an upper right portion of the integrated circuit forming the SoC 100. However, using the NoC 120, the array 105 can nonetheless communicate with, for example, programmable logic (PL) 125, a processor subsystem (PS) 130 or input/output (I/O) 135 which may disposed at different locations throughout the SoC 100.

In addition to providing an interface between the DPEs 110 and the NoC 120, the SoC interface block 115 may also provide a connection directly to a communication fabric in the PL 125. In one embodiment, the SoC interface block 115 includes separate hardware components for communicatively coupling the DPEs 110 to the NoC 120 and to the PL 125 that is disposed near the array 105 in the SoC 100. In one embodiment, the SoC interface block 115 can stream data directly to a fabric for the PL 125. For example, the PL 125 may include an FPGA fabric which the SoC interface block 115 can stream data into, and receive data from, without using the NoC 120.

Although FIG. 1 illustrates one block of PL 125, the SoC 100 may include multiple blocks of PL 125 (also referred to as configuration logic blocks) that can be disposed at different locations in the SoC 100. For example, the SoC 100 may include hardware elements that form a field programmable gate array (FPGA). However, in other embodiments, the SoC 100 may not include any PL 125—e.g., the SoC 100 is an ASIC.

Figure 2:
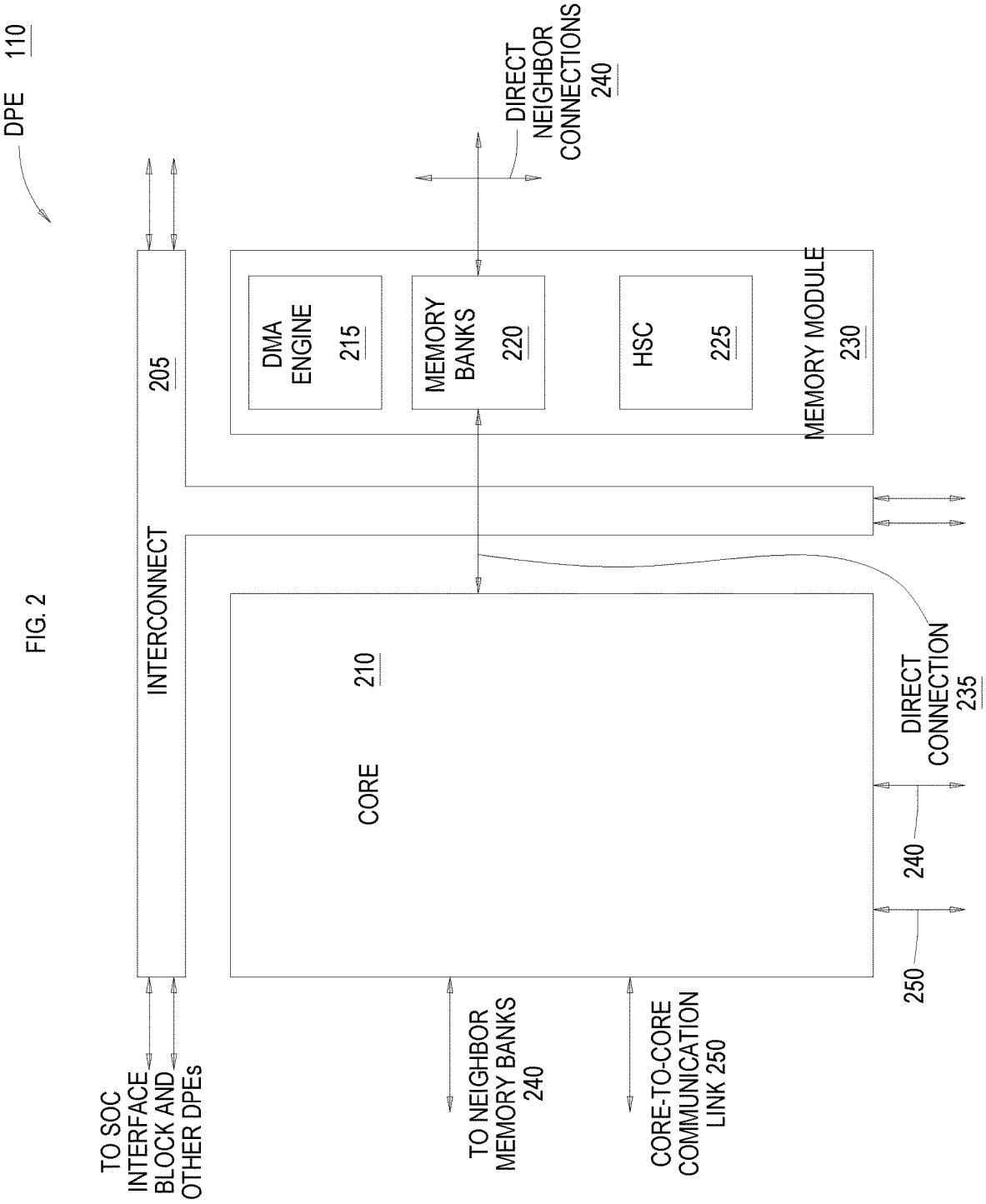
FIG. 2 is a block diagram of a data processing engine in the data processing engine array, according to an example.

FIG. 2 is a block diagram of a DPE 110 in the DPE array 105 illustrated in FIG. 1, according to an example. The DPE 110 includes an interconnect 205, a core 210, and a memory module 230. The interconnect 205 permits data to be transferred from the core 210 and the memory module 230 to different cores in the array 105. That is, the interconnect 205 in each of the DPEs 110 may be connected to each other so that data can be transferred north and south (e.g., up and down) as well as east and west (e.g., right and left) in the array of DPEs 110.

Referring back to FIG. 1, in one embodiment, the DPEs 110 in the upper row of the array 105 relies on the interconnects 205 in the DPEs 110 in the lower row to communicate with the SoC interface block 115. For example, to transmit data to the SoC interface block 115, a core 210 in a DPE 110 in the upper row transmits data to its interconnect 205 which is in turn communicatively coupled to the interconnect 205 in the DPE 110 in the lower row. The interconnect 205 in the lower row is connected to the SoC interface block 115. The process may be reversed where data intended for a DPE 110 in the upper row is first transmitted from the SoC interface block 115 to the interconnect 205 in the lower row and then to the interconnect 205 in the upper row that is the target DPE 110. In this manner, DPEs 110 in the upper rows may rely on the interconnects 205 in the DPEs 110 in the lower rows to transmit data to and receive data from the SoC interface block 115.

In one embodiment, the interconnect 205 includes a configurable switching network that permits the user to determine how data is routed through the interconnect 205. In one embodiment, unlike in a packet routing network, the interconnect 205 may form streaming point-to-point connections. That is, the electrical paths and streaming interconnects (not shown) in the interconnect 205 may be configured to form routes from the core 210 and the memory module 230 to the neighboring DPEs 110 or the SoC interface block 115. Once configured, the core 210 and the memory module 230 can transmit and receive streaming data along those routes. In one embodiment, the interconnect 205 is configured using the Advanced Extensible Interface (AXI) 4 Streaming protocol.

In addition to forming a streaming network, the interconnect 205 may include a separate network for programming or configuring the hardware elements in the DPE 110. Although not shown, the interconnect 205 may include a memory mapped interconnect which includes different electrical paths and switch elements used to set values of configuration registers in the DPE 110 that alter or set functions of the streaming network, the core 210, and the memory module 230.

The core 210 may include hardware elements for processing digital signals. For example, the core 210 may be used to process signals related to wireless communication, radar, vector operations, machine learning applications, and the like. As such, the core 210 may include program memories, an instruction fetch/decode unit, fixed-point vector units, floating-point vector units, arithmetic logic units (ALUs), multiply accumulators (MAC), and the like. However, as mentioned above, this disclosure is not limited to DPEs 110. The hardware elements in the core 210 may change depending on the engine type. That is, the cores in a digital signal processing engine, cryptographic engine, or FEC engine may be different.

The memory module 230 includes a direct memory access (DMA) engine 215, memory banks 220, and a hardware synchronization circuitry (HSC) 225 or other type of hardware synchronization block. In one embodiment, the DMA engine 215 enables data to be received by, and transmitted to, the interconnect 205. That is, the DMA engine 215 may be used to perform DMA reads and write to the memory banks 220 using data received via the interconnect 205 from the SoC interface block or other DPEs 110 in the array.

The memory banks 220 can include any number of physical memory elements (e.g., DRAM or SRAM). For example, the memory module 230 may be include 4, 8, 16, 32, etc. different memory banks 220. In this embodiment, the core 210 has a direct connection 235 to the memory banks 220. Stated differently, the core 210 can write data to, or read data from, the memory banks 220 without using the interconnect 205. That is, the direct connection 235 may be separate from the interconnect 205. In one embodiment, one or more wires in the direct connection 235 communicatively couple the core 210 to a memory interface in the memory module 230 which is in turn coupled to the memory banks 220.

In one embodiment, the memory module 230 also has direct connections 240 to cores in neighboring DPEs 110. Put differently, a neighboring DPE in the array can read data from, or write data into, the memory banks 220 using the direct neighbor connections 240 without relying on their interconnects or the interconnect 205 shown in FIG. 2. In one embodiment, the connections 240 may include interfacing signals to the hardware locks of neighboring tiles. The HSC 225 can be used to govern or protect access to the memory banks 220. In one embodiment, before the core 210 or a core in a neighboring DPE can read data from, or write data into, the memory banks 220, the HSC 225 provides a lock to an assigned portion of the memory banks 220 (referred to as a "buffer"). That is, when the core 210 wants to write data, the HSC 225 provides a lock to the core 210 which assigns a portion of a memory bank 220 (or multiple memory banks 220) to the core 210. Once the write is complete, the HSC 225 can release the lock which permits cores in neighboring DPEs to read the data.

Because the core 210 and the cores in neighboring DPEs 110 can directly access the memory module 230, the memory banks 220 can be considered as shared memory between the DPEs 110. That is, the neighboring DPEs can directly access the memory banks 220 in a similar way as the core 210 that is in the same DPE 110 as the memory banks 220. Thus, if the core 210 wants to transmit data to a core in a neighboring DPE, the core 210 can write the data into the memory bank 220. The neighboring DPE can then retrieve the data from the memory bank 220 and begin processing the data. In this manner, the cores in neighboring DPEs 110 can transfer data using the HSC 225 while avoiding the extra latency introduced when using the interconnects 205. In contrast, if the core 210 wants to transfer data to a non-neighboring DPE in the array (i.e., a DPE without a direct connection 240 to the memory module 230), the core 210 uses the interconnects 205 to route the data to the memory module of the target DPE which may take longer to complete because of the added latency of using the interconnect 205 and because the data is copied into the memory module of the target DPE rather than being read from a shared memory module.

In addition to sharing the memory modules 230, the core 210 can have a direct connection to cores 210 in neighboring DPEs 110 using a core-to-core communication link 250. That is, instead of using either a shared memory module 230 or the interconnect 205, the core 210 can transmit data to another core in the array directly without storing the data in a memory module 230 or using the interconnect 205 (which can have buffers or other queues). For example, communicating using the core-to-core communication links 250 may use less latency than transmitting data using the interconnect 205 or shared memory (which requires a core to write the data and then another core to read the data). In one embodiment, the core-to-core communication links 250 can transmit data between two cores 210 in one clock cycle. In one embodiment, the data is transmitted between the cores on the link 250 without being stored in any memory elements external to the cores 210. In one embodiment, the core 210 can transmit a data word or vector to a neighboring core using the links 250 every clock cycle, but this is not a requirement.

In one embodiment, the communication links 250 are streaming data links which permit the core 210 to stream data to a neighboring core. Further, the core 210 can include any number of communication links 250 which can extend to different cores in the array. In this example, the DPE 110 has respective core-to-core communication links 250 to cores located in DPEs in the array that are to the right and left (east and west) and up and down (north or south) of the core 210. However, in other embodiments, the core 210 in the DPE 110 illustrated in FIG. 2 may also have core-to-core communication links 250 to cores disposed at a diagonal from the core 210. Further, if the core 210 is disposed at a bottom periphery or edge of the array, the core may have core-to-core communication links to only the cores to the left, right, and bottom of the core 210.

Figure 3:
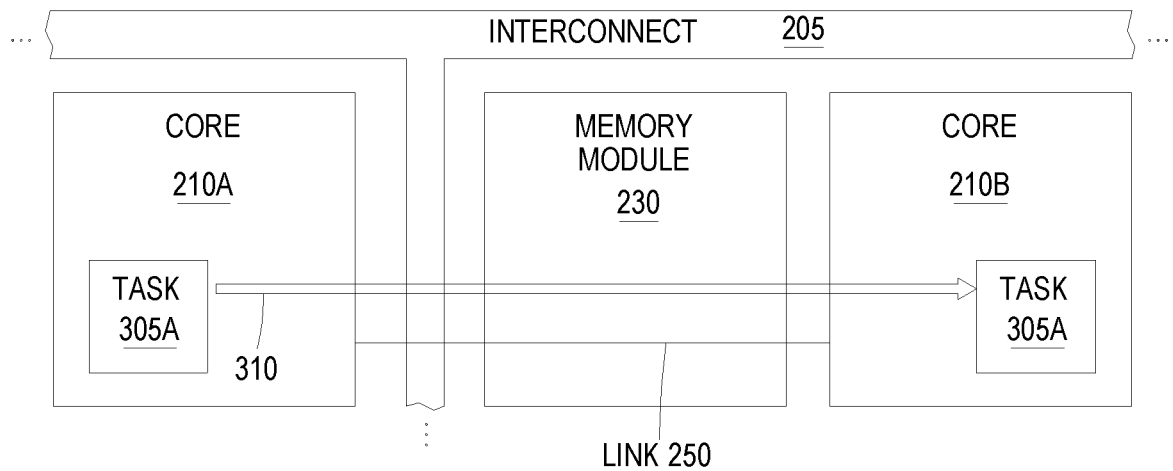
FIG. 3 is a block diagram of communicating between cores using a core-to-core communication link, according to an example.

FIG. 3 is a block diagram of communicating between cores using a core-to-core communication link 250, according to an example. As shown, the core 210A executes a task 305A which generates data that is then transmitted to the core 210B which executes a task 305B. In one embodiment, the tasks 305A and 305B may be sub-tasks of the same task (also referred to as a kernel) which is too large or complicated to be completed on one of the cores 210. For example, the tasks 305A and 305B may be part of the same finite impulse response (FIR) kernel used when performing equalization. The FIR kernel is split into sub-tasks—i.e., task 305A and 305B—and is assigned to the two cores 210 since the kernel may have too high of compute requirements to be executed on a single core 210. In this example, the task 305B may receive the intermediate results generated by the task 305A. In other embodiments, a kernel can have more than two tasks as shown here.

FIG. 3 also illustrates the interconnect 205 and the memory module 230. However, these communication elements may not provide sufficient bandwidth to transfer the intermediate results generated by the task 305A to the task 305B in the core 210B. Instead, the arrow 310 illustrates transmitting the data generated by the task 305A directly from the core 210A to the core 210B using the core-to-core communication link 250. As shown, the link 250 bypasses both the interconnect 205 and the memory module 230. In one embodiment, the link 250 may have at least an order of magnitude higher amount of bandwidth than the interconnect 205. Stated differently, using the core-to-core communication link 250 may enable the cores 210 to stream data at a rate that is at least ten times faster than transferring data using the streaming network provided in the interconnect 205. Further, the core-to-core link 250 may introduce less latency than using the memory module 230 as shared memory (assuming both the core 210A and the core 210B have direct connections to the memory module 230).

Although the core-to-core communication link 250 bypasses the memory module 230 (e.g., may be separate from and independent of the memory module 230 and the interconnect 205), the cores 210 can nonetheless access the memory module 230 when executing the tasks 305A and 305B. For example, the memory module 230 may store tap coefficients or be used for internal data buffering in the cores 210. However, in one embodiment, the link 250 does not use significant buffering when transmitting data from the core 210A to the core 210B. That is, the link 250 may transmit data without buffering the data in memory or buffers that are external to the cores 210, although there can be some buffering within the cores 210 themselves.

In one embodiment, the link 250 forms a parallel data interface that includes multiple lanes which can send data in parallel. For example, each clock cycle, the core 210 may transmit a data word or vector which includes multiple data bits transmitted in parallel. In addition to transmitting the intermediate data generated by the task 305A, the link 250 may also transmit validity data or handshaking data to the core 210B. For example, if the core 210B is stalled, the producer core 210A is also stalled to avoid data loss. In another embodiment, the link 250 may be a serial communication link.

The link 250 may be unidirectional or bidirectional. For example, the link 250 may permit communication only from the core 210A to the core 210B but not from the core 210B to the core 210A. However, in another embodiment, the link 250 may be bidirectional to permit a task (or sub-task) in the core 210B to transmit intermediate data to the core 210A.

In one embodiment, the core 210A includes a core-to-core communication link 250 only to cores that directly neighbor the core 210A. For example, the core 210 may have respective communication links 250 to cores 210 located to the west, north, and south as well as the core 210B located to the east. The core 210A can use all of these links 250 at the same time or only a sub-portion of those links 250 at any given time. In one embodiment, due to routing constraints the core 210A does not include links 250 to cores that are not direct neighbors. For example, a core 210 that is located on the same row as the core 210A but is two or more columns away from the core 210A (i.e., is not a direct neighbor) may not have a direct core-to-core link 250 to the core 210A. Similarly, a core 210 that is on the same column as the core 210A in the array but is located two or more rows away from the core 210A is not a direct neighbor, and thus, may not include a core-to-core communication link to the core 210A. In this embodiment, the core 210A may include a core-to-core communication link only to the cores that are direct neighbors and are immediately adjacent.

Figure 4A:
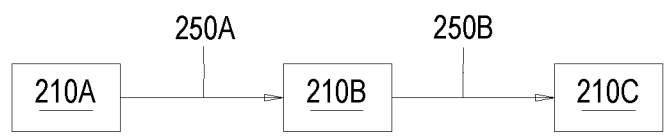
FIGS. 4A and 4B illustrate communicating between cores, according to an example.
Figure 4B:
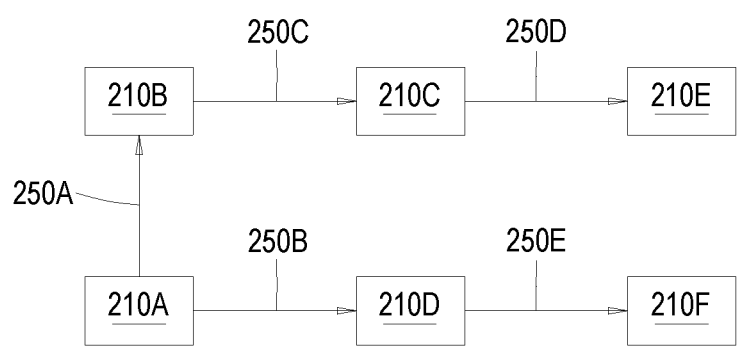

FIGS. 4A and 4B illustrate communicating between cores, according to an example. That is, FIGS. 4A and 4B illustrate cascaded cores 210 which transmit streaming data using respective communication links 250. In FIG. 4A, the cores 210A-C are cascaded using the core-to-core communication links 250A and 250B. In one embodiment, the cores 210 may execute different sub-tasks of the same task or kernel. However, the embodiments herein are not limited to such and the cores 210A-C can execute different kernels or tasks that may share data using the links 250.

FIG. 4A illustrates that more than two cores 210 can be cascaded to share intermediate data generated by the tasks in the cores 210. Once the kernel is completed by the task on the core 210C, the finalized data may be transmitted to a different core or to a different hardware component in the SoC. For example, the core 210C may transmit the data using the interconnect 205 shown in FIGS. 2 and 3 to another core in the array, or to the SoC interface block where the data can then be forwarded to a different hardware element in the SoC. In another example, the core 210C may transmit data to a shared memory where another core 210 can retrieve the data to perform a different task.

FIG. 4B illustrates another cascade of cores 210 that transmit data using respective core-to-core communication links 250. In this example, the core 210A transmits data directly to two different cores using two different core-to-core communication links 250. That is, the core 210A transmits data to the core 210B using communication link 250A and the same or different data to the core 210D using the communication link 250B. For example, the core 210B may be located up (or north) of the core 210A in the array while the core 210D is located to the right (or east) of the core 210A. The core 210A may transmit data to the cores 210B and 210D in parallel or at different clock cycles using the links 250A and 250B. That is, the links 250A and 250B may be separate and independent links.

In other embodiments, the core 210A may transmit data to cores disposed at different locations than what is shown in FIG. 4B. For example, the core 210A may transmit data to cores located to the south and west of the core 210A in the array.

The core 210B receives the intermediate data from the core 210A and processes the data using its assigned task. Once complete, the core 210B uses the link 250C to transmit the processed intermediate data to the core 210C. The core 210C then processes the received data and uses the link 250D to transmit intermediate data to the core 210E. Thus, FIG. 4B illustrates a first stream that includes the cores 210A, B, C, and E.

The core 210D receives the intermediate data from the core 210A and processes the data using its assigned task. Once complete, the core 210D uses the link 250E to forward its processed intermediate data to the core 210F. Thus, the cores 210A, D, and F illustrate a second stream in FIG. 4B. The first and second streams may be part of the same task or may be two separate tasks being executed by the cores 210. Further, although not shown, FIG. 4B may include data connections between the cores in the two streams. For example, the core 210C may have a direct core-to-core communication link to the core 210D. In this manner, the two streams can share data and may be synchronized. In another example, the two streams may share the same head (e.g., the core 210A) and the same tail (e.g., the 210F) if the core 210E has a core-to-core communication link 250 to the core 210F.

Although FIG. 4B illustrates two streams, the core 210A can generate any number of streams. For example, the core 210A can be the head of any number of streams which can terminate at the same tail or different tails. Further, the streams can branch. For example, the data processed by the core 210D may be forwarded to the core 210F as well as another core which is not shown. Thus, the second stream can be split into different streams using different core-to-core communication links 250.

Figure 5A:
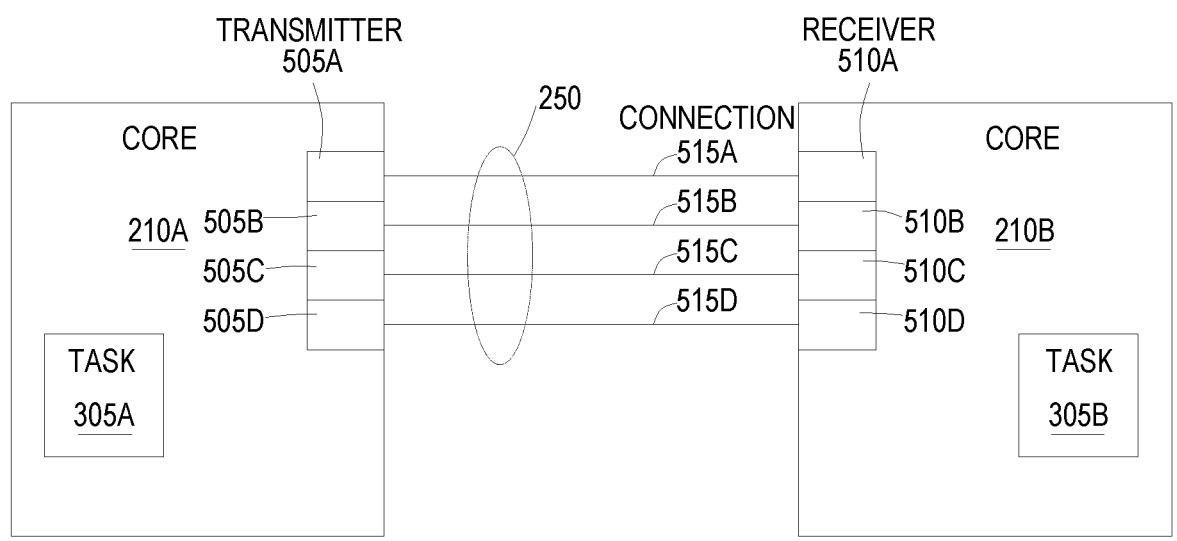
FIGS. 5A and 5B illustrate communicating between cores using an adaptive core-to-core communication link, according to an example.
Figure 5B:
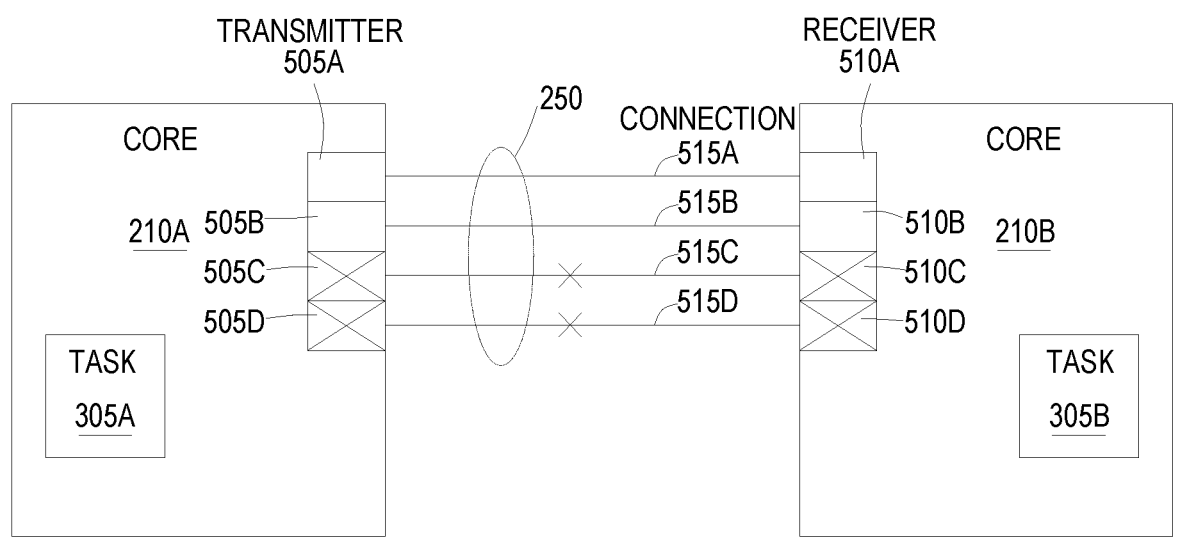

FIGS. 5A and 5B illustrate communicating between cores using an adaptive core-to-core communication link, according to an example. As shown, the core 210A includes the task 305A which may be a sub-task of the same kernel or task as the task 305B executing on the core 210B. Moreover, the core 210A includes multiple transmitters 505 that correspond to respective receivers 510 in the core 210B. That is, the core 210A includes four transmitters 505 that are coupled to a respective one of the receivers 510 in the core 210B using a connection 515. In other embodiments, the transmitters 505 and the receivers 510 are transceivers which means the cores 210A and 210B can use the same circuits to communicate from the core 210B to the core 210A.

The connections 515 are part of the core-to-core communication link 250. That is, the connections 515 can be cumulatively considered as the communication link 250. The connections 515 can include one wire or multiple wires. For example, each transmitter 505 may transmit a respective data bit or bits (e.g., a word or vector) using one of the connections 515. Although FIG. 5A illustrates the core 210A containing four transmitters 505 and the core 210B having four receivers 510, the cores 210A and 210B can have any number of transmitters 505 and receivers 510.

During operation, the task 305A generates intermediate data which the core 210A routes to the transmitters 505. In one embodiment, during each clock cycle the core 210A transmits data on each of the transmitters 505 to the receivers 510 on the core 210B. That is, the transmitters 505 can transmit data in parallel to the receivers 510. For example, the transmitter 505A may transmit an X-bit word to the receiver 510A in the same clock cycle as the transmitter 505B transmits an X-bit word to the receiver 510B, the transmitter 505C transmits an X-bit word to the receiver 510C, and the transmitter 505D transmits an X-bit word to the receiver 510D.

Using multiple transmitter and receiver pairs as shown in FIG. 5A to form the core-to-core communication link 250 can offer more flexibility to transfer different data types relative to using a single transmitter 505 and receiver 510. In one embodiment, the type of data transmitted on the link 250 may varying depending on the task 305. For example, some tasks may transmit data that uses all of the physical connections 515 while another task transmits data that uses only a sub-portion of the physical connections 515. For example, a first task may transmit a data word (i.e., a first data type) during each clock cycle with a bit length that uses all of the connections 515. However, a second task may have a corresponding data word (i.e., a second data type) with a smaller bit length that does not use all of the connections 515.

FIG. 5B illustrates a configuration of the link 250 when transmitting a data type that does not use all of the transmitter and receiver pairs in the cores 210. In this example, the transmitters 505A and 505B are active while the transmitters 505C and 505D are inactive. That is, because of the data type generated by the task 305A, the core 210A uses only the transmitters 505A and 505B to transmit data to the core 210B. As such, the connections 515C and 515D and the receivers 510C and 510D are unused (as shown by the "X") in this example. In contrast, the receivers 510A and 510B are active and receive the data from the transmitters 505A and 505B using the connections 515A and 515B. The task 305B can then process the received data and forward the processed data to another core (e.g., using another core-to-core link 250, shared memory, or an interconnect). In another example, the core 210B may transmit the processed data to the SoC interface block which can forward the data to another hardware component in the SoC.

Later, the task 305A may change the type of data being sent on the core-to-core communication link 250. In response, the core 210A may change the number of active transmitters (either active one or more of the inactive transmitters or deactivate one of the active transmitters) to accommodate the data width of the new type of data. Alternatively, the core 210A may begin to execute a different task which uses a different type of data, in which case the core 210 may reconfigure the link 250 to have a different number of active transmitter and receiver pairs than shown in FIG. 5B. In this manner, the link 250 can adapt to accommodate different data types when transmitting data directly between cores.

Figure 6:
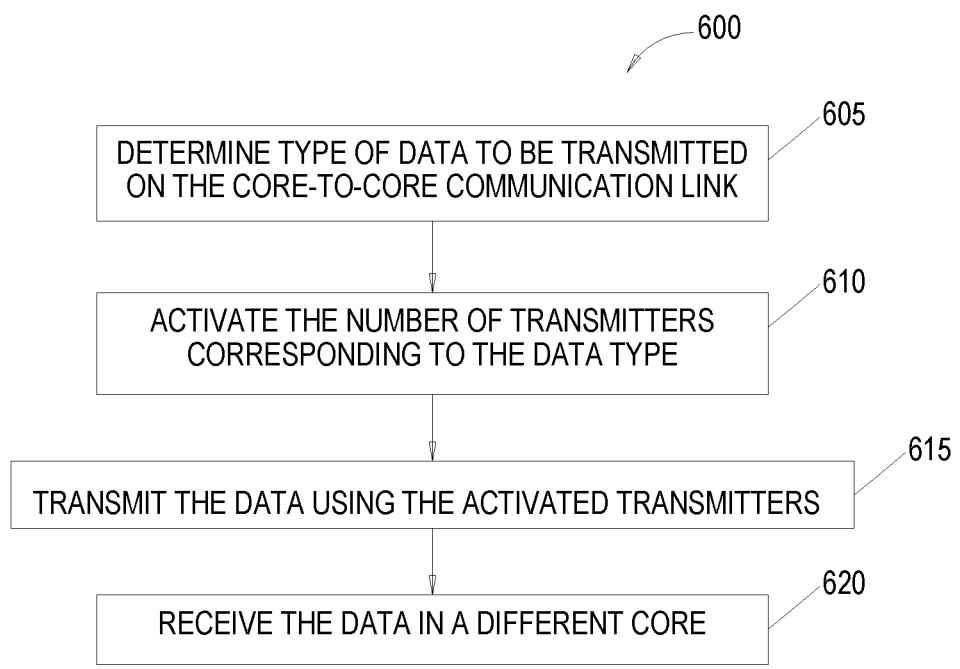
FIG. 6 is a flowchart for communicating between cores using an adaptive core-to-core communication link, according to an example.

FIG. 6 is a flowchart of a method 600 for communicating between cores using an adaptive core-to-core communication link, according to an example. The method begins at block 605 where a core determines the type of data to be transmitted on the core-to-core communication link. In one embodiment, the core identifies the type of intermediate data generated by the task executing in the core. For example, the core may determine the type of a data generated by the task when the task is assigned to the core.

At block 610, the core activates the number of transmitters corresponding to the data type. As shown in FIG. 5B, the core 210A has four transmitters 505 but only two of the four transmitters are active while the other two are inactive. The various types of data may use different numbers of the transmitters to send a data word or vector to a neighboring core using the core-to-core communication link. In response, the core activates the corresponding transmitters and deactivates the remaining transmitters. Moreover, the core may inform the neighboring core coupled to the transmitters how many of the transmitters are active. The neighboring core can then activate the corresponding numbers of receivers while deactivating the remaining receivers. In this manner, the cores can activate the transmitter and receiver pairs used for core-to-core communication.

At block 615, the core transmits the data using the activated transmitters. As mentioned above, each transmitter may transmit multiple bits in parallel using connections in the core-to-core communication link. For example, each receiver may transmit an X-bit word (X being an arbitrary number of bits) which can be combined with the X-bit words transmitted by the other active transmitter (or transmitters) to form a larger data word or vector. In this manner, the core can transmit a data vector or word to the neighboring core using one or more transmitters during each clock cycle.

At block 620, the neighboring core receives the data. In one embodiment, the neighboring core has as many receivers active as the transmitting core has transmitters active. If the data type changes (e.g., a new task is being executed), the transmitting core and neighboring core can reconfigure the core-to-core communication link to activate a different number of transmitter and receiver pairs.

Figure 7:
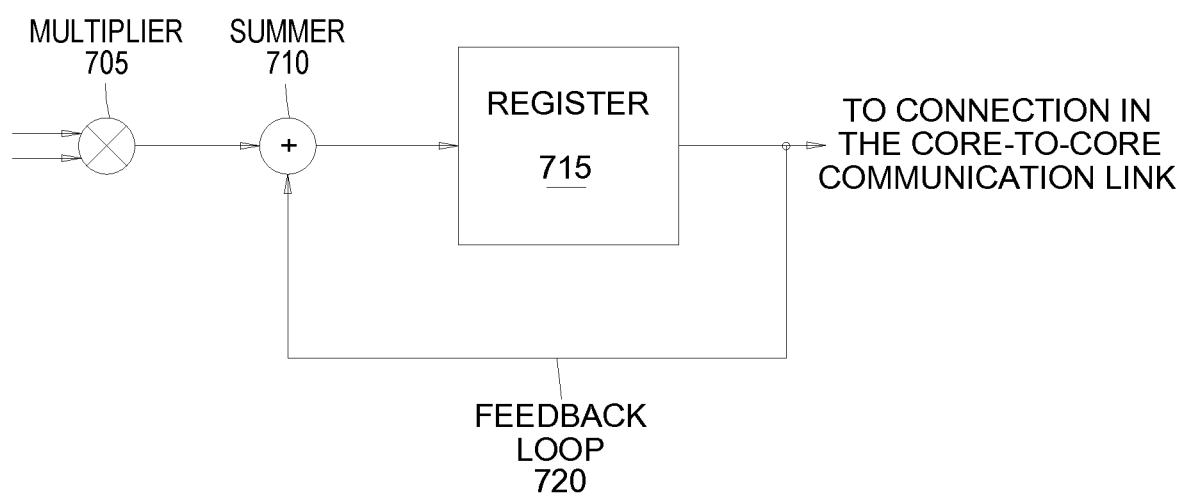
FIG. 7 illustrates circuitry for a transmitter in a core-to-core communication link, according to an example.

FIG. 7 illustrates circuitry for the transmitter 505 in a core-to-core communication link, according to an example. In one embodiment, the transmitter 505 includes a multiply accumulator (MAC or MAC unit). The multiply accumulate operation illustrated in FIG. 7 can be used in a digital signal processing application but the embodiments herein are not limited to such. That is, the transmitter 505 may include different types of circuitry when being used for a different operation such as graphics processing, cryptography, a database query, and the like.

The MAC in the transmitter 505 includes a multiplier 705 that computes the product of two operands (shown as inputs in FIG. 7). The resulting calculation is outputted by the multiplier 705 to a summer 710 which sums the current output value of the multiplier 705 to a previously stored output of the accumulator. That is, the summer 710 uses a feedback loop 720 to add the previous output of the summer 710 (which was stored in an accumulation register 715) to the current output value of the multiplier 705. The summer 710 stores the result in the register 715.

In one embodiment, the summer 710 and the register 715 are referred to as an accumulator which adds the previous output value of the MAC to the current product outputted by the multiplier 705. When the MAC operation is performed with floating point numbers, the operation might be performed with two roundings, or with a single rounding. When performed with a single rounding, the MAC operation may be called a fused multiply-add (FMA) or fused multiply-accumulate (FMAC). When the MAC operation is performed with integers, the operation may be exact. A block floating-point algorithm can be used to emulate floating point while using a fixed point processor. The block floating-point algorithm can assign a block of data an exponent, rather than single units themselves being assigned an exponent, thus making them a block, rather than a simple floating point.

In one embodiment, each of the transmitters 505 in the core used to form the core-to-core communication link includes the respective circuitry shown in FIG. 7. That is, the circuitry shown in FIG. 7 may be repeated for each of the transmitters 505 in the core. As mentioned above, depending on the data type, only a portion of the transmitters 505 may be active when transmitting data.

In addition to coupling to the feedback loop 720, the output of the accumulator register 715 is coupled to one of the connections in the core-to-core communication link. Although not shown, the transmitter 505 may have a driver for transmitting the data stored in the register 715 (e.g., an X-bit word) onto the connection which may include multiple parallel lanes.

Figure 8A:
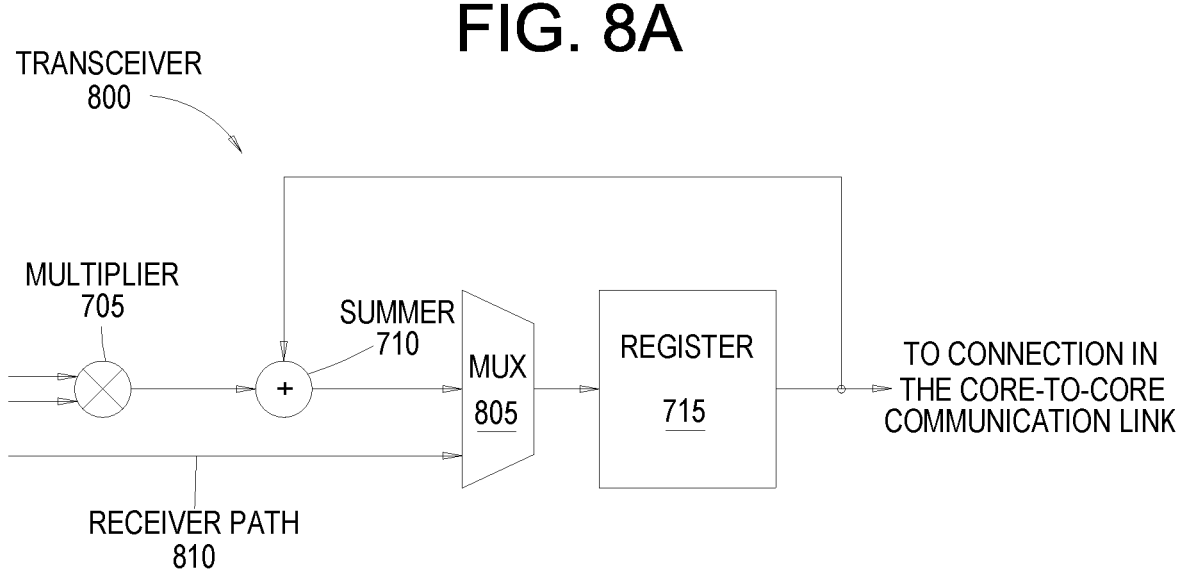
FIGS. 8A and 8B illustrates transceivers transmitting and receiving data using a core-to-core communication link, according to an example.
Figure 8B:
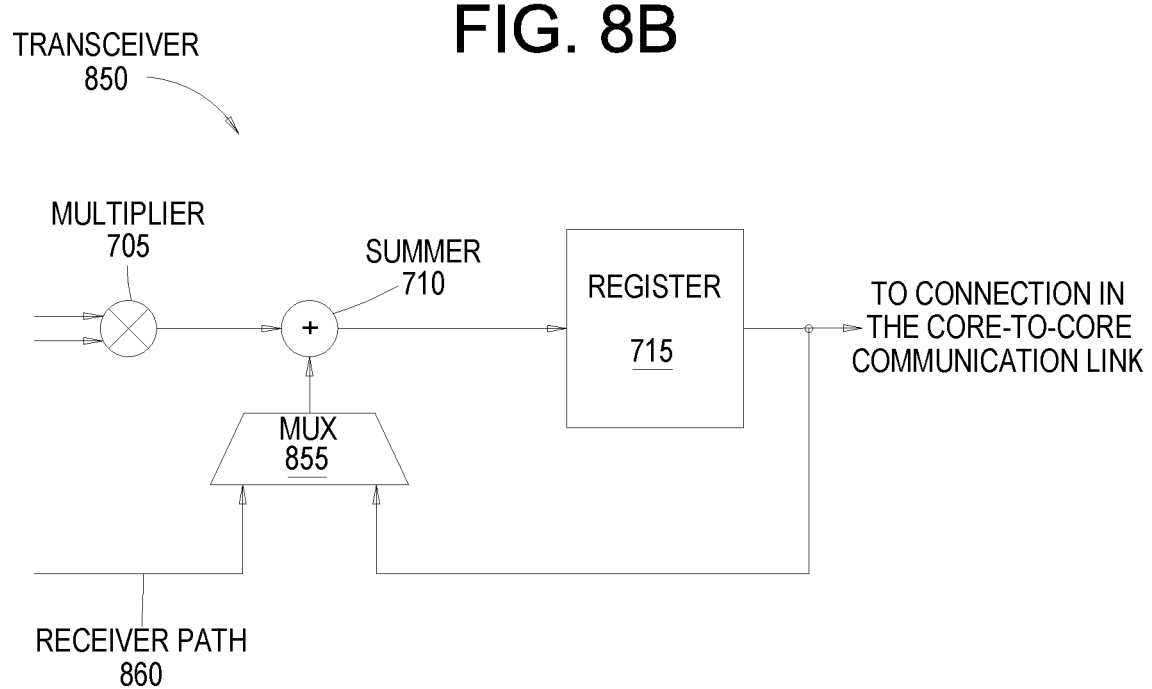

FIGS. 8A and 8B illustrates transceivers transmitting and receiving data using a core-to-core communication link, according to an example. FIG. 8A illustrates a transceiver 800 for transmitting and receiving data from the core to the connection in the core-to-core communication link. For example, the transmitters 505 and receiver 510 shown in FIGS. 5A and 5B can be replaced by the transceiver 800 in FIG. 8A or the transceiver 850 in FIG. 8B so that data can be transmitted from the core 210A to the core 210B and vice versa.

To receive data, the transceiver 800 includes a receiver path 810 for receiving data from a connection in the core-to-core communication link. That is, a neighboring core can use the core-to-core communication link to transmit data to the transceiver 800 using the receiver path 810. The transceiver 800 includes a mux 805 to select whether the receiver path 810 or the output of the summer 710 is communicatively coupled to the register 715. When transmitting data, the mux 805 selects the output of the summer 710 to transmit data to the register 715. However, when receiving data, the mux 805 couples the receiver path 810 to the register 715.

FIG. 8B illustrates a transceiver 850 which performs a similar function as the transceiver 800 but places a mux 855 in a different location than in the transceiver 800 in FIG. 8A. That is, instead of placing a mux between the summer 710 and the register 715, the mux 855 is disposed between the output of the register 715 and an input to the summer 710. When transmitting data, the mux 855 selects the output of the register 715 to transmit data to the summer 710 to form a feedback loop. However, when receiving data, the mux 855 couples a receiver path 860 to the input to the summer 710.

In one embodiment, a core 210 may include a combination of the transceiver 800 and transceiver 850. That it, a circuit could implement both types of the transceivers 800 and 850 to transmit data to a different core using a direct core-to-core communication link.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A method of processing data in an array of data processing engines in a system on a chip (SOC), the array of data processing engines including a first data processing engine having a first core and a first memory external to the first core and a second data processing engine having a second core and a second memory external to the second core, the method comprising:
    processing the data in the first core; and
    transmitting the processed data directly from the first core to the second core using a core-to-core communication link that is dedicated to communication between the first core and the second core and bypasses the memories in the first and the second data processing engines, wherein the first core and second core being directly adjacent cores in an array of cores, and the second core further processes the data processed by the first core.

2. The method of claim 1, further comprising:
    executing a first task in the first core to generate the data; and
    executing a second task in the second core to process the data received from the first core, wherein the first and second tasks are sub-tasks for a same kernel.

3. The method of claim 1, wherein transmitting the data directly from the first core to the second core is performed without storing the data in memory external to the first and second cores.

4. The method of claim 1, wherein the first core comprises a plurality of transmitters and the second core comprises a plurality of receivers, wherein the core-to-core communication link comprises a plurality of connections coupling the plurality of transmitters to the plurality of receivers.

5. The method of claim 4, further comprising:
    determining a type of the data being generated at the first core; and
    activating at least one of the plurality of transmitters based on the type of the data and deactivating at least one of the plurality of transmitters for transmitting the data to the second core.

6. The method of claim 4, wherein the first core comprises a plurality of transceivers that comprises the plurality of transmitters and receivers to receive and transmit data from the second core using the core-to-core communication link, wherein each of the plurality of transceivers comprises a multiply accumulator (MAC) unit.

7. The method of claim 1, wherein the first and second data processing engines each comprises an interconnect, wherein the interconnects of the first and second data processing engines are communicatively coupled.

8. The method of claim 7, wherein the core-to-core communication link is separate from, and independent of, the interconnects in the first and second data processing engines.

9. The method of claim 7, wherein the interconnects in the first and second data processing engines comprise a streaming network.

10. The method of claim 1, further comprising:
transmitting data directly from the second core to a third core using a second core-to-core communication link, wherein the third core is disposed in a third data processing engine in the array, and wherein the first data processing engine directly neighbors the second data processing engine in the array and the second data processing engine directly neighbors the third data processing engine in the array.

11. A system on a chip (SoC), comprising:
a first data processing engine in an array of data processing engines, the first data processing engine including a first core and a first memory external to the first core;
a second data processing engine in the array, the second data processing engine including a second core and a second memory external to the second core; and
a core-to-core communication link coupled to the first core at a first end and the second core at a second end, the core-to-core communication link being dedicated to communication between the first core and the second core, the first core and second core being directly adjacent cores in an array of cores, wherein the first core is configured to transmit data directly to the second core using the core-to-core communication link bypassing the memories in the first and second data processing engines, wherein the first core processes the data and the second core further processes the data.

12. The SoC of claim 11, wherein the first core is configured to execute a first task to generate the data and the second core is configured to execute a second task to process the data received from the first core, wherein the first and second tasks are sub-tasks for a same kernel.

13. The SoC of claim 11, wherein transmitting the data directly from the first core to the second core using the core-to-core communication link is performed without storing the data in memory external to the first and second cores.

14. The SoC of claim 11, wherein the first core comprises a plurality of transmitters and the second core comprises a plurality of receivers, wherein the core-to-core communication link comprises a plurality of connections coupling the plurality of transmitters to the plurality of receivers.

15. The SoC of claim 14, wherein the first core is configured to:
determine a type of the data being generated at the first core; and
activating at least one of the plurality of transmitters based on the type of the data and deactivating at least one of the plurality of transmitters for transmitting the data to the second core.

16. The SoC of claim 14, wherein the first core comprises a plurality of transceivers that comprises the plurality of transmitters and receivers to transmit and receive data from the second core using the core-to-core communication link, wherein each of the plurality of transceivers comprises a multiply accumulator (MAC) unit.

17. The SoC of claim 11, wherein the first and second data processing engines each comprises an interconnect, wherein the interconnects of the first and second data processing engines are communicatively coupled.

18. The SoC of claim 17, wherein the core-to-core communication link is separate from, and independent of, the interconnects in the first and second data processing engines.

19. The SoC of claim 17, wherein the interconnects in the first and second data processing engines comprise a streaming network.

20. The SoC of claim 11, further comprising:
a third data processing engine in the array, the third data processing engine comprises a third core; and
a second core-to-core communication link coupled to the second core at a first end and to the third core at a second end, wherein the second core transmits data directly to the third core using the second core-to-core communication link, and wherein the first data processing engine directly neighbors the second data processing engine in the array and the second data processing engine directly neighbors the third data processing engine in the array.

21. An integrated circuit comprising:
an array of data processing engines (DPEs), each DPE of the array of DPEs comprising:
a core comprising hardened logic and a program memory, the hardened logic being configured to execute instructions stored in the program memory to process data; and
a memory including memory banks; and
a plurality of core-to-core communication links, each core-to-core communication link of the plurality of core-to-core communication links being coupled to respective cores of a corresponding neighboring pair of DPEs of the array of DPEs, the respective core-to-core communication link being dedicated to communication between the cores of the corresponding neighboring pair of DPEs, the respective core-to-core communication link being configured to communicate data directly between the cores of the corresponding neighboring pair of DPEs bypassing the memories of the corresponding neighboring pair of DPEs,
wherein a first core of a first neighboring pair of DPEs of the array of DPEs is configured to process the data and a second core of the first neighboring pair of DPEs is configured to further process the data.

* * * * *